(12) United States Patent
Yair et al.

(10) Patent No.: US 6,351,574 B1
(45) Date of Patent: Feb. 26, 2002

(54) INTERACTIVE VERIFICATION OF OCRED CHARACTERS

(75) Inventors: Eyal Yair, Givat Elah; Ronen Shevach, Netanya, both of (IL)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/210,327

(22) Filed: Dec. 11, 1998

(51) Int. Cl.[7] .................................................. G06K 7/10
(52) U.S. Cl. ......................... 382/321; 382/311; 382/312
(58) Field of Search ................................ 382/321, 311, 382/312

(56) References Cited

U.S. PATENT DOCUMENTS 5,455,875 A    10/1995   Chevion et al. ............ 382/311
5,659,167 A  * 8/1997    Wang et al. ............ 235/472.01
5,666,549 A  * 9/1997    Tsuchiya et al. ............ 707/500
5,721,940 A  * 2/1998    Luther et al. ................ 707/506

OTHER PUBLICATIONS

"Smart Key—ICR Data Entry and Verification Toolkit", Jun. 1998. http://w3.haifa.ibm.com/projects/image/smartkey/index.ht.

* cited by examiner

Primary Examiner—Jose L. Couso
Assistant Examiner—Anh Hong Do
(74) Attorney, Agent, or Firm—Darby & Darby (57) ABSTRACT

This invention discloses a key-in method including a manual keying in phase, and an automatic accuracy enhancement phase, wherein at least one of the manual phase, the automatic phase and the interaction therebetween is dependent, at least one dataflow point, on data generated previous to said dataflow point.

7 Claims, 2 Drawing Sheets

INTERACTIVE VERIFICATION OF OCRED CHARACTERS

FIELD OF THE INVENTION

The present invention relates to apparatus and methods for facilitating OCR verification processes.

BACKGROUND OF THE INVENTION

Many key-in applications are automated by scanning the hard-copy pages and using Optical Character Recognition (OCR) techniques to recognize the text written in various fields on the pages. No OCR technique is immune to errors, and hence, the automatic OCR phase is typically followed by a verification phase in which the OCRed characters are verified either automatically and/or manually. For most of these applications the scanned pages are forms in which characters may be interrelated within the field or across fields by some logical relationship such as arithmetic, dictionarial and/or logical relationship. This interrelation between characters can be utilized to automatically verify and/or increase the confidence level of part of the characters involved in the relationship. However, basing the verification on solely automatic methods is seldom sufficient. For the vast majority of applications, and in order to achieve a high accuracy level of final recognition, the intervention of a human operator to manually verify characters is normally needed. A useful techniques to implement this manual key-in verification is to display characters to the operator on a computer screen and have some navigation application for the operator to mark and/or correct the erroneous characters.

In many of the key-in verification techniques, fields are extracted from the scanned images and displayed to the operator along with the OCR results. The operator uses a keyboard or mouse to point at the erroneous characters and mark and/or correct them. This technique is called a video coding technique. U.S. Pat. No. 5,455,875 to Chevion et al describes a method, called SmartKey, for organizing the data on the screen and for utilization of a mouse in such a way that yields an improvement factor of 3–6 in productivity relative to ordinary video coding schemes. That is, each operator can key-in 3–6 times more characters than in conventional video coding techniques, or, equivalently, a lesser number of human operators is required to key-in the data.

The disclosures of all publications mentioned in the specification and of the publications cited therein are hereby incorporated by reference.

SUMMARY OF THE INVENTION

The present invention seeks to provide improved apparatus and methods for facilitating OCR verification processes.

To date, two complementary methods are used in order to compose an application: a manual phase, in which new information is obtained from a human operator, generally via a keyboard, and an automatic phase in which new information may be concluded from the logical interrelationships between characters. Both methods are stochastic in nature since they both contain errors. Also, there is no guarantee on the final error rate in the final data. Moreover, these methods cannot be dynamically tuned to approach a desired error rate.

The present invention seeks to provide a new key-in method that interactively combines manual key-in with automatic logical phases such that the manual and automatic phases are data driven. Multiple phases are typically interleaved in such a way that the data acquired in each phase is fed into the next phase typically with the aim of minimizing the number of manual key-strokes. Preferably, a goal of the present system is to optimally use the logical interrelationships between the characters in order to achieve the lowest possible number of key strokes by the human operators, and thus to further increase the overall productivity, measured by number of characters verified per man-hour. The stochastic characteristics of both the automatic logical phase and the manual human operator performance is typically measured, on-line, and the application can be tuned to approach any desired accuracy level, for any type of data, at minimal manual labor time.

The method of the present invention typically achieves an additional productivity factor of 3–10 relative to the aforementioned prior art SmartKey technique. The improvement factor with respect to the prior art SmartKey method depends on the quantity of logical relationships present in the application forms.

The method of the present invention is also termed herein the KIM (Key-In-Management) method. It typically manages OCRed data to/from various key-in stations, where each key-in station (KIS) is a physical or virtual station in which new information is added to the characters sent to these stations, generally via a human operator who supplies feedback regarding data displayed on a computer screen.

A preferred embodiment of the present invention seeks to obtain final OCRed data that best complies with the various logical rules of the form with minimum human labor cost (or maximum efficiency). This goal is typically accomplished by using a set of key-in stations that may supply information on characters at certain accuracy and certain cost. Examples of such key-in stations are human operators keying-in data by video coding techniques using Smartkey carpets, triplets, and/or fields, where Smartkey is a video coding technique described in U.S. Pat. No. 5,455,875 to Chevion. The method of the present invention uses a dispatcher that sends characters to the key-in stations e.g. in order to optimize some predefined cost (of system effectiveness), a logic module that supplies services regarding the inter and intra fields logic rules, and an OCR engine that supplies the probabilities of the OCRed characters. The dispatcher obtains services from the key-in stations and reports to the manager level of the system of the present invention.

Many document processing applications involve extracting ASCII information from images of scanned papers. The basic tool to supply this information is an OCR (Optical Character Recognition) engine that is capable of identifying characters and/or other symbols and marks in a given image. Some OCR engines supply only the most probable guess for each of the characters out of some alphabet of characters applicable for the field containing the character. This type of OCR output is called a hard decision output in which the OCR supplies the final decision for that character. Generally, a confidence level attribute is supplied with the output guess, which is, in most cases, normalized to the range [0,1]. Other OCR engines may supply more information, such as the probability vector of the character image to be one of each of the alphabet characters. OCR engines of this kind are said to supply a soft decision where the calling application may use these probabilities to generate a more global decision for the character images.

The OCR used by the present invention may even include a combination of several types of OCR classifiers via some voting scheme such that the OCR output may be more complex and/or data dependent.

No matter how the OCR of the application is implemented internally it will make errors. In most cases, the error level of the OCR is above the desired error rate required by the application. In order to supply the ASCII data at the error level requested by the application, some of the errors must be corrected. The application may thus use the OCR engine as a tool within a more complex system architecture that eventually supplies the ASCII data at the desired error rate.

In order to decrease the error rate beyond that supplied by the OCR engine, other information regarding the characters is incorporated. A major source of information in many document processing applications is the logical relationships between the application characters. There are many possible types of logical relationships such as: arithmetic (e.g., summation, multiplication, equality, inequality, etc.), syntax (e.g., dates), mathematical formulas (e.g., check-sum digits), and dictionaries (in which words or even phrases are taken from an a priori known dictionary). These logic rules are known a priori, and are defined specifically for each application. In most cases, the application characters comply with the logic rules and these rules may be used to decrease the overall error rate. Of course, one should be aware of the fact that it is possible for some characters to disobey these logic rules (for example when the writer of the character(s) intentionally or unintentionally did write a logically erroneous formula). Sometimes the logic rules may be somewhat vague as for example in a multiplication logical relationship were rounding is used at different accuracy levels of rounding.

The combination of logic rules and OCR may increase the system accuracy but generally it is insufficient for most practical applications. Another source of information that is generally used is manual correction of errors by human operators. Characters are gathered in some form (or in several different forms, depending on the data) and are displayed to human operators that key in the data. Keyed-in information supplied by human operators is also susceptible to errors, depending on human capability, expertise, mental and physical compliance, and the way the data is displayed. In many cases, human accuracy is time dependent since he/she may make more errors after several hours of work. However, sending characters to human operators increases the information gained on the characters and thus may be used to further decrease the system error rate.

Using human operators to key-in characters is costly. The cost is specific to each application but can be defined in terms of labor, space, system response time, etc. Generally, increasing the key-in cost increases the system accuracy. The present invention seeks to minimize the key-in cost of supplying an ASCII representation of the data at a desired accuracy level. Typically, some or all of the following factors are substantially optimized:

what are the characters to be sent to the key-in stations.

In what order should these characters be sent.

How characters are organized and displayed.

To which operator should each character be sent.

When should the key-in process terminate.

The system typically performs a scheduling function, dynamically determining the characters regarding which more information should be requested, the order in which these characters should be sent to the key-in station and the key-in stations to which each character should be submitted. These routing decisions are preferably made dynamically since the information acquired regarding the characters depends on all of the following: the data, the OCR accuracy, the type of logic, and the returned values from the human operators. The system preferably dynamically incorporates the on-line acquired information as to optimize the key-in cost. It also preferably combines all its information sources (OCR, Logic and Key-in stations) at each time instant to take the optimal routing decision.

Since there are many types of OCR engines, many types of Logical rules, and many ways in which data can be gathered and displayed to a human operator, the system of the present invention is preferably as generic as possible in order to enable its application to a wide variety of document processing systems regardless of the individual elements comprising these systems. The method of the present invention is useful for a general model of a document processing system involving OCR engines, Logic rules and generic key-in stations. The system of the present invention is preferably generic, dynamic and costly effective, and is applicable to various types of document processing systems.

According to a preferred embodiment of the present invention, the system of the present invention has some or all of the following features:

Introduction of an overall system model for verification of OCRed data, that incorporates computerized computations techniques with key-in stations personed by human operators in order to optimize desired efficiency cost of the overall system. The computation methods and the ways data is processed, distributed, displayed and collected to/from the key-in stations are optimized together, in contrast to just optimizing each unit separately.

The system can be asked to supply any desired accuracy level. The improvement of the accuracy is monotonic, where it is continuously being assessed and monitored by the system automatically (via a predictor) to yield the desired accuracy at the minimal key-in cost. Assessment of the accuracy level is carried out on-line based on the specific data being processed, rather than just statistical off-line average assessment of contemporary key-in methods.

Logical interrelationships between the form characters are applied in a closed-loop method being verified by human operators in an optimal verification process that verifies the minimal number of characters to achieve compliance with the logic rules applied to the form fields. This is in contrast to current open-loop methods used to apply logic. Moreover, character probabilities are used to optimize the hypotheses suggested by the Logic.

The system can overcome key-in errors of the human operators and/or logically incorrect formulas and yet supply any desired accuracy level of the final ASCII data. This is achieved by both the closed-loop method connecting the logic hypotheses with the results of the human keyed-in information, and by the on-line monitoring of the achieved accuracy level.

The system can correct errors even for True-LRSs (true logical relationships which are logically correct either because their OCR accuracy was perfect or because OCR errors occurred which canceled each other out). The system can also correct errors for characters that do not participate in any logical relationship.

The model is generic in the sense that is may be applied to the vast majority of form processing and key-in applications. It can use any OCR engine. Any desired accuracy level may be requested by the user. There is ample flexibility in defining system parameters such as the key-in cost that is being optimized, key-in stations and the way they operate and manipulate their data, and the trade-offs between manual labor cost and computation consumption cost.

On-line modification of key-in station characteristics: Key-in station characteristics may be learned and tuned on-line to comply with different human operators, different key-in methods, different time of day and/or other working condition parameters. These newly adapted characteristics are readily used by the selector and dispatcher automatically to optimize the usage of the key-in stations.

The probability of making an error in a key-in station can be measured on-line if the true value of the characters are known. Hence, a sub-process can be used inside the key-in process that presents deliberate errors to the key-in station operator whose true values are known. Character images are presented inside the application characters as if they were erroneously recognized, and the response of the key-in station operator is monitored for these characters. Since the true values and the keyed-in values are known, the error probability can be assessed at any desired time instant. The key-in cost can immediately be measured from the application characters themselves as the average key-in time per character.

There is thus provided, in accordance with a preferred embodiment of the present invention, a key-in method including a manual keying in phase, and an automatic accuracy enhancement phase, wherein at least one of the manual phase, the automatic phase and the interaction therebetween is dependent, at least one dataflow point, on data generated previous to the dataflow point.

Also provided, in accordance with another preferred embodiment of the present invention, is an OCR-based system for supplying machine readable text at low key-in cost, the system including a plurality of key-in stations manned by human operators, and a manager dispatching OCR-generated characters to the key-in stations iteratively to monotonically increase character confidence until a desired accuracy level is achieved, wherein the manager is operative to decide which characters are sent to which key-in stations by optimizing to minimize overall key-in cost.

Further in accordance with a preferred embodiment of the present invention, the system also includes an accuracy assessor operative to assess a current accuracy level of the system, on-line, based on data being processed.

Still further in accordance with a preferred embodiment of the present invention, logical interrelationships between input characters are applied in a closed loop interconnecting hypotheses derived from the logical interrelationships with information arriving from the key-in stations.

Also provided, in accordance with still another preferred embodiment of the present invention, is a method for supplying machine readable text at low key-in cost, the method including applying logical interrelationships between input characters in a closed loop interconnecting hypotheses derived from logical interrelationships with keyed-in information, and correcting errors for at least one of the following: true logical relationships, false logical relationships, and characters not participating in any logical relationship.

Further in accordance with a preferred embodiment of the present invention, the method also includes prompting a user to request a desired accuracy level, and performing the applying and correcting steps until the desired accuracy level is achieved.

Further provided, in accordance with another preferred embodiment of the present invention, is a method for supplying machine readable text at low key-in cost, the method including using key-in stations to improve accuracy of machine-generated machine readable text, including dispatching machine-generated machine readable text to various key-in stations using stored key-in station characteristic parameters to reduce key-in cost, and learning the key-in stations' characteristics and tuning the key-in station characteristic parameters, on-line, thereby to adjust for variation in working conditions.

Further in accordance with a preferred embodiment of the present invention, the variation in working conditions include changes in at least one of the following: human operators operating the key-in stations, key-in methods, time of day, and working conditions.

Also provided, in accordance with another preferred embodiment of the present invention, is a system for supplying machine readable text at low key-in cost, the system including a plurality of key-in stations, and a manager dispatching characters to the key-in stations iteratively to monotonically increase character confidence until a desired accuracy level is achieved, wherein the manager is operative to decide which characters are sent to which key-in stations by optimizing to minimize overall key-in cost.

Further in accordance with a preferred embodiment of the present invention, the input characters include OCR characters.

Also provided, in accordance with another preferred embodiment of the present invention, is a key-in system including a data driven manual unit for accepting input which is manually keyed in, and an accuracy enhancer for automatically processing the manually keyed in input in order to enhance the accuracy thereof including performing a plurality of accuracy enhancing iterations wherein the data flow in each iteration depends on the output of a previous iteration.

Further provided, in accordance with another preferred embodiment of the present invention, is an OCR-based method for supplying machine readable text at low key-in cost, the method including dispatching OCR-generated characters to a plurality of key-in stations iteratively to monotonically increase character confidence until a desired accuracy level is achieved, wherein the manager is operative to decide which characters are sent to which key-in stations by optimizing to minimize overall key-in cost.

Further in accordance with a preferred embodiment of the present invention, the method also includes assessing a current accuracy level of the system, on-line, based on data being processed.

Still further in accordance with a preferred embodiment of the present invention, logical interrelationships between input characters are applied in a closed loop interconnecting hypotheses derived from the logical interrelationships with keyed-in information.

Also provided, in accordance with another preferred embodiment of the present invention, is a system for supplying machine readable text at low key-in cost, the system including a logic unit operative to apply logical interrelationships between input characters in a closed loop interconnecting hypotheses derived from logical interrelationships with keyed-in information, and an error correction unit operative to correct errors for at least one of the following: true logical relationships, and characters not participating in any logical relationship.

Further in accordance with a preferred embodiment of the present invention, the error correction unit is operative to correct errors until a user-selected accuracy level is achieved.

Also provided, in accordance with another preferred embodiment of the present invention, is a system for supplying machine readable text at low key-in cost, the system including a dispatcher operative to dispatch machine-generated machine readable text to various key-in stations using stored key-in station characteristic parameters to reduce key-in cost, and a key-in station monitor operative to learn the key-in stations' characteristics and to tune the key-in station characteristic parameters, on-line, thereby to adjust for variation in working conditions.

Additionally in accordance with a preferred embodiment of the present invention, the variation in working conditions include changes in at least one of the following: human operators operating the key-in stations, key-in methods, time of day, and working conditions.

Also provided, in accordance with another preferred embodiment of the present invention, is a method for supplying machine readable text at low key-in cost, the method including dispatching characters to a plurality of key-in stations iteratively to monotonically increase character confidence until a desired accuracy level is achieved, wherein the manager is operative to decide which characters are sent to which key-in stations by optimizing to minimize overall key-in cost.

Further in accordance with a preferred embodiment of the present invention, the input characters include OCR characters.

Also provided, in accordance with a preferred embodiment of the present invention, is an OCR system including an OCR unit, at least one manually operable OCR verification stations receiving output from the OCR unit for verification, and an accuracy monitor operative to instantaneously estimate current accuracy of OCR output generated by the OCR unit in conjunction with the OCR verification stations and to terminate operation of the OCR unit and the OCR verification stations when the estimated current accuracy reaches a threshold value.

Further in accordance with a preferred embodiment of the present invention, the accuracy monitor uses character probabilities to estimate current accuracy.

Still further in accordance with a preferred embodiment of the present invention, the hypotheses are based on character probabilities.

Additionally in accordance with a preferred embodiment of the present invention, the machine-readable text includes ASCII output.

Further in accordance with a preferred embodiment of the present invention, the machine readable text includes ASCII.

BRIEF DESCRIPTION OF THE DRAWINGS

The present invention will be understood and appreciated from the following detailed description, taken in conjunction with the drawings in which.

DETAILED DESCRIPTION OF PREFERRED EMBODIMENTS

Below is a summary of the set of notations and abbreviations used in the specification and claims:

KIS: Key-In station.
LRS: a Logical relationship (e.g., summation, multiplication, identity, etc.).
True-LRS: a logical relationship that is satisfied (i.e., correct)
False-LRS: a logical relationship that is not satisfied (i.e., incorrect).
LRS(x): a logical relationship containing the character x.
S(x): the set of all the characters in all logical relationships in which x participates. In other words, the set of all characters which are contained in at least one LRS(x).
Nkis: Number of key-in stations.
P(x): probability (or confidence level) of a character image to be the ASCII character x.
Pocr(x): recognition probability of an image x as supplied by the OCR.
Perr(i,P(x)): probability of error of the i-th key-in station for a character with probability P(x).
C(i,P(x)): cost of requesting service from a key-in station for a character with probability P(x).
Pkis(i,P(x)): recognition probability of the i-th key-in station for a character with probability P(x).
Pr(OCR=x & Pocr(x)=p+−dp|TRUE=y): confusion matrix histogram.
Pr(TRUE=y|OCR=x & Pocr(x)=p+−dp): aposteriori probability histogram.
Ptarget: desired accuracy level per character.
Ntotal: total number of characters in a batch.
Nerr: estimated number of errors in a batch.
Ntarget: maximum number of allowed errors in a batch (according to the desired accuracy level).

Figure 1:
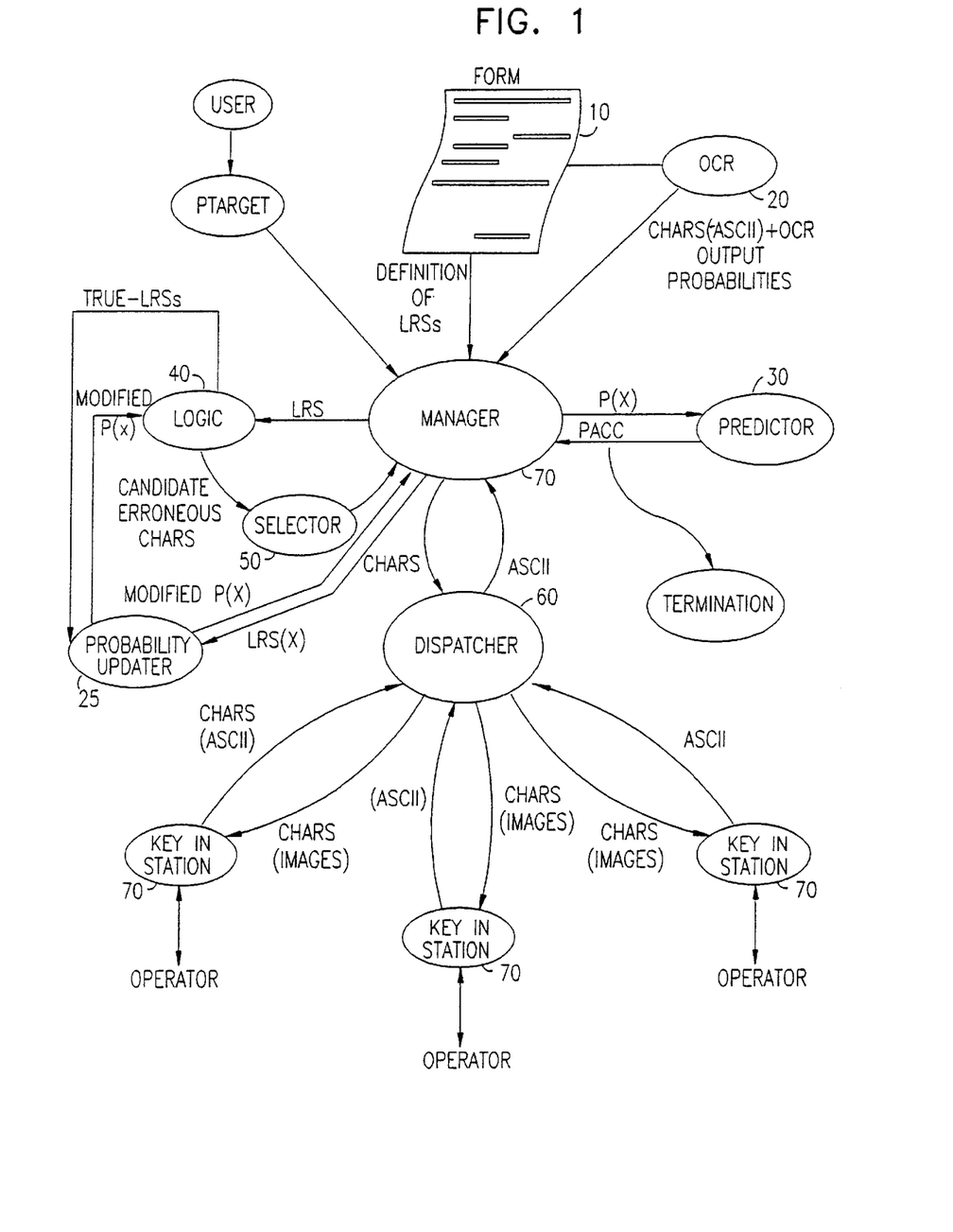
FIG. 1 is a simplified functional block diagram of a key-in management system constructed and operative in accordance with a preferred embodiment of the present invention.

Reference is now made to FIG. 1 which is a simplified functional block diagram of a key-in management system constructed and operative in accordance with a preferred embodiment of the present invention.

The inputs to the system of FIG. 1 typically include the following which are typically inputs to manager 70, described in detail below:

OCR output probabilities, Pocr(x).
Form definition: Also termed herein "definition of LRSs". The set of logical relationships between the fields in the form.
the desired accuracy level of the output ASCII data: Ptarget (0<Ptarget<1).

The system of FIG. 1 preferably includes an OCR unit 20 operating on a form 10. The OCR unit 20 preferably includes a translation table for translating OCR outputs into "true" probabilities for a given data.

Since the OCR unit 20 may supply biased probability values due to voting, constraints, heuristics, etc., the actual OCR output is typically translated into "true" probabilities which are defined as the probability of OCR performance on a given training data. These true characteristic probabilities are typically given as the following two histograms which characterize the OCR capabilities of the OCR unit 20:

Pr(OCR=x & Pocr(x)=p+−dp|TRUE=y)—confusion matrix histogram, containing the probabilities that the OCR recognized the image as the character x with confidence +−dp around p, when the true value of the image was the character y.
Pr(TRUE=y|OCR=x & Pocr(x)=p+−dp)—aposteriori probability histogram, containing the probabilities that the true value of the image was the character y given that the OCR recognized it as x with confidence +−dp around p. dp defines the bin width in the histogram.

These two histograms are typically computed using an off-line learning procedure on a training set of characters, i.e. a set of character images whose ASCII equivalents are known. Alternatively, the histograms are not used and instead, OCR probabilities generated by the OCR unit are used directly.

The system of FIG. 1 also preferably includes a plurality of key-in stations 70. A KIS (key-in station) is a station that obtains an input image of a character and supplies an ASCII character for that image as output.

Each key-in station is typically characterized by the following two quantities:

probability of error, Perr(i,P(x)), or equivalently, the recognition probability of the KIS: Pkis(i,P(x)).

Cost of the service: C(i,P(x))

where i is the index of the key-in station, and P(x) is the recognition probability of the input character x. Typically, both the error probability and the cost of the key-in stations depend on the character probability P(x). Typically, as P(x) of a character image decreases, its key-in cost and error probability increase. For example, sending a character to a wrong carpet of the SmartKey video coding technique, described in U.S. Pat. No. 5,455,875 to Chevion, causes either missing it by the operator (=key-in error) or sending it to triplets and then keying it there (=increase in key-in cost).

The system of FIG. 1 is operative to supply desired machine readable text at minimum key-in cost, where cost is any measurable quantity. The system of the present invention preferably uses the key-in stations iteratively to monotonically increase character confidence until the desired accuracy level is achieved. The decision of which of the characters to send at any time instant and to which of the key-in stations should the character be sent is optimized to minimize the overall key-in cost.

The output of the system of FIG. 1 typically includes an ASCII representation of all the fields in the form at a reliability defined by Ptarget. In other words, Ptarget is the desired accuracy level per character.

Figure 2:
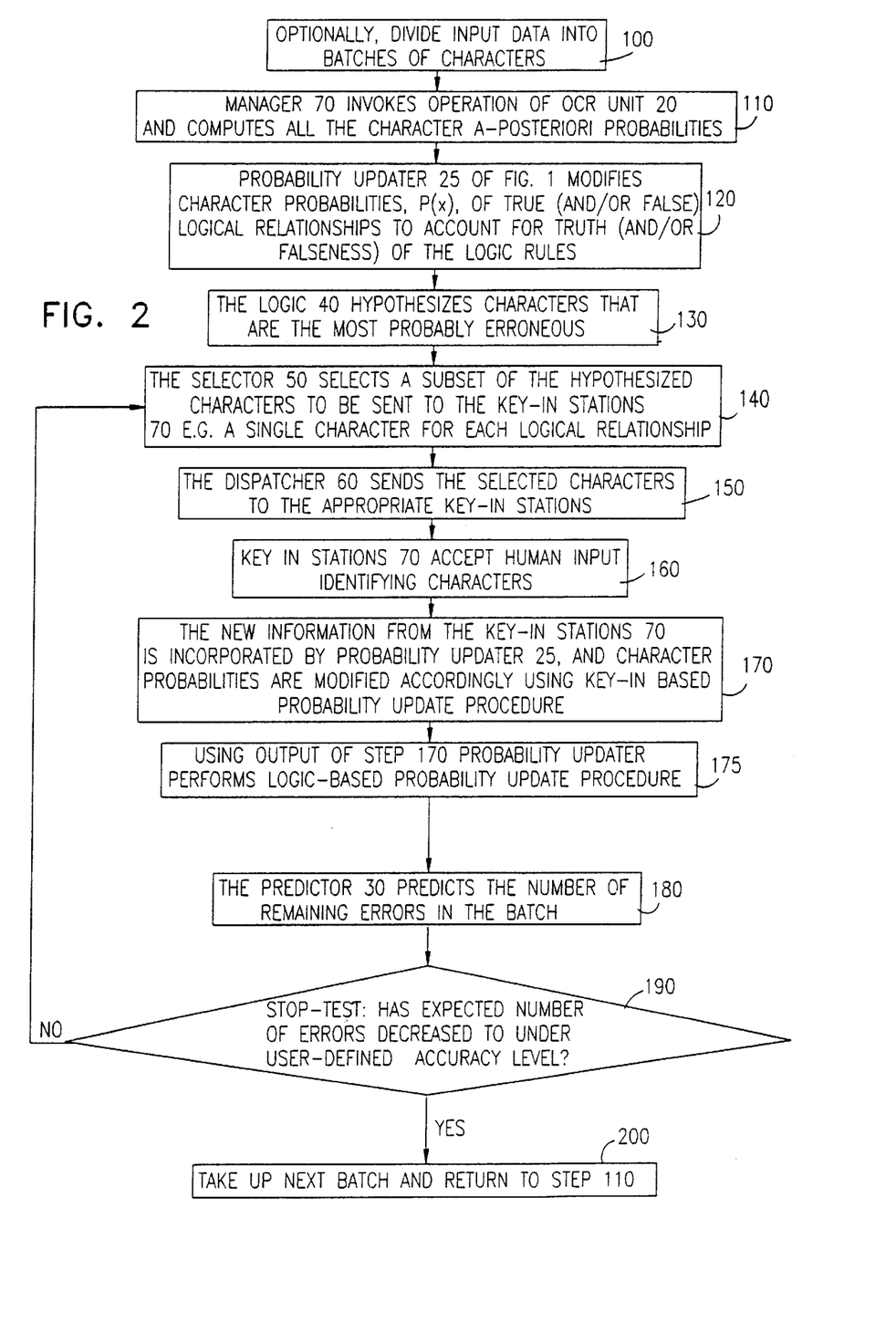
FIG. 2 is a simplified flowchart illustration of a preferred method of operation for the system of FIG. 1.

The system of FIG. 1 also includes a predictor 30, a logic unit 40, a selector 50, a dispatcher 60 and a manager 70 which manages the operations of units 30, 40, 50 and 60. Briefly:

The Predictor 30 predicts the number of remaining errors in a batch of characters, Nerr, based on the character probabilities, P(x), which are generated by probability updater 25 in steps 170 and 175 of the method of FIG. 2. P(x) are typically kept continuously updated by probability updater 25 which, by performing steps 170 and 175 of FIG. 2, uses two probability update procedures respectively (key-in based and logic-based, both described in detail below), as more information becomes available for each character image. Nerr, the predicted number of remaining errors in the batch of characters, is kept dynamically updated accordingly, by the predictor 30. The value of Nerr is used to monitor the progress and termination of the key-in process.

Logic unit 40 supplies the following information on a given logical relationship:

is the logical relationship True or False.

if the logical relationship is True: what are the modified probabilities of S(x).

if the logical relationship is False: what is/are the most probable character(s) to be swapped in order to make the logical relationship True, and what is that most probable solution.

The Selector 50 selects a subset of a set of characters suggested by the Logic 40 as being possibly erroneous. This subset is sent to key-in stations 70. The dispatcher 60 dispatches a set of selected characters to the appropriate key-in stations so as to minimize the key-in cost. The Manager 70 is the higher level of the system of FIG. 1 and is operative to manage the data via invocation of the agents of FIG. 1: probability updater 25, predictor 30, logic 40, selector 50 and dispatcher 60.

The units of FIG. 1 are now described in detail:

PROBABILITY UPDATER 25

When a character x is sent to a key-in station with a probability P(x), upon returning from the key-in station its probability is modified by probability updater 25 to Pnew (x). This key-based probability update procedure is described in detail below. Then, the probabilities of all the characters in S(x) are further modified by the probability updater 25 to incorporate the logical interrelationships between the characters and the newly modified character. The process by which these probabilities are further modified is also termed herein the "logic-based Probability Update" process and is described in detail below.

A preferred embodiment of the key-in based probability update procedure performed by probability updater 25 is now described in detail: When a character having probability P(x) is sent to a key-in station 70 having recognition probability Pkis(x), the modified character probability of the returned character, Pnew(x), is some combination of P(x) and Pkis(x). In this section a formula to compute Pnew(x) based on approximation of a Baysian voting rule is suggested.

Let us denote the current probability of x to be X as $P(x=X)$ or $P(x)$, where X is the current value associated with x. Denote the probability, in the key-in station, of x to be Y as $Pkis(x=Y)$ or $Pkis(x)$, where Y is the value associated with x by the key-in station. Finally, denote the new probability for x to be Y as $Pnew(x=Y)$ or $Pnew(x)$.

Key-in probability update preferably involves voting between two sources: the old source and the key-in station source. The approximation is carried out by assuming that the only possible values for x are X and Y. This means that if $X \neq Y$ then $P(x=Y)=1-P(x=X)$ and the same holds for Pkis. Hence, the voting between them is given as follows:

if $P(x)<=0.5$ $Pnew(x=Y)=Pkis(x=Y)$ (i.e., the old probability is ignored and the value Y is assigned to this character with the key-in station probability).

Else,

If $X=Y$:

$Pnew(x)=[Pkis(x)*P(x)]/[Pkis(x)*P(x)+(1-Pkis(x))*(1-P(x))]$

Else, (i.e., if $X \neq Y$):

$Pnew(x)=[Pkis(x)*(1-P(x))]/[Pkis(x)*(1-P(x))+(1-Pkis(x))*P(x)]$

Pnew(x) is the output of the key-in based probability update procedure performed by probability updater 25.

Pkis(x) is almost always greater than 0.5. Obviously, there is little use for a key-in station whose recognition probability is less than 0.5.

This suggested formula yields that: $Pnew(x)>=P(x)$, as desired. It ensures that Nerr will decrease in each prediction update performed by predictor 30.

An exact Baysian rule could be applied too, but this would require the knowledge of the probabilities of all the allowed values for x, which are generally not known. The approximation suggested is obtained by limiting the allowed values for x to X and Y, which are always known.

A preferred embodiment of the logic-based Probability Update procedure performed by probability updater 25 after the key-in based probability update procedure, is now described in detail. The output of this procedure is termed herein Pi|true. When a character probability is modified, all the characters related to it via some logical relationship are preferably modified too to express the logical interrelationship between them. In principle, a Baysian rule could have been applied to compute the conditional probabilities of all the characters in LRS(x), conditioned on the truthfulness of the logical relationship LRS(x).

Let us assume that there are M characters involved in a logical relationship LRS: xi, i=1, ..., M, where these characters are interrelated through some function f(xi)=0, and Pi=Pr(xi=X) is the current probability of the i-th character to have the value X. The modified probability for the i-th character is denoted by Pi|True, which is the probability for the i-th character conditioned on the assumption that the logical relationship is True. A Baysian modification rule will require to compute:

Pi|True=Pr(xi=X, LRS=True)/Pr(LRS=True)

where each expression requires the summation over all the allowed combination of values for all the characters in the logical relationship. Since generally the probabilities of a character for all its allowed values is not available or not feasible to compute, an approximate formula is generally required. In this section an update formula is suggested. This formula relies only on known probability values, namely, the probability of each character for only its recognition hypothesis value.

Let us denote by Pi=Pr(xi=Xi) where Xi is the current recognition hypothesis for the i-th character. Denote also by Qi=1−Pi the error probability for the i-th character. We want to compute the following conditional probability:

Pi|True=Pr(xi=Xi|LRS=True)

To simplify the computation we assume that the logical relationship can be true if there are any two or three errors. Obviously, not all combination of two (or three) errors yield a True logical relationship, but this will substantially simplify the computation of the new probabilities.

The conditional probability is computed via the conditional error probability $$Qi|True=P(!i,T)/P(T)$$

where

P(!i,T)=Pr(xi≠Xi, LRS=True)
P(T)=Pr(LRS=True)

Assuming that a True logical relationship may be obtained by no errors, two errors, or three errors yield for the denominator:

$$P(T) = \Prod_{\substack{m \\ m \neq j,k,n}}[Pm] + \Sum_{m \neq j,k,n}\left[Qj * Qk * \Prod_{j,k}[Pm]\right] +$$

$$\Sum_{m \neq j,k}\left[Qj * Qk * Qn * \Prod_{j,k,n}[Pm]\right]$$

and $$P(!i, T) = Qi * \left\{\Sum_{j \neq i}\left[Qj * \Prod_{m \neq i,j}[Pm]\right] + \Sum_{j,k \neq i}\left[Qj * Qk * \Prod_{m \neq i,j,k}[Pm]\right]\right\}$$

Let us denote by

Ri=Qi/Pi=(1−Pi)/Pi

Then Qi|True can be written as:

$$Qi|True = Ri * \left\{\Sum_{j \neq i}[Rj] + \Sum_{j,k \neq i}[Rj * Rk]\right\} \Big/$$

$$\{1 + \Sum_{j,k}[Rj * Rk] + \Sum_{j,k,n}[Rj * Rk *\}$$

Then, for Ri|True=Qi|True/Pi|True we get:

$$Ri|True = Ri * \frac{\Sum_{j \neq i}[Rj] + \Sum_{j,k \neq i}[Rj * Rk]}{1 + \Sum_{j,k \neq i}[Rj * Rk] + \Sum_{j,k,n \neq i}[Rj * Rk * Rn]}$$

and, finally, Pi|True is obtained via:

Pi|True=1/(1+Ri|True)

The above formula can be straightforwardly extended to consider also more than three errors in logical relationship.

The specific formulas described above for both probability update procedures are not intended to be limiting. Any suitable formulae may be employed to adjust probabilities to take into account manually keyed-in ASCII identities of character images and the ensuing changes in logical relationships relating the characters.

The modified probabilities computed by probability updater 25 normally yield a decrease in Nerr. If Nerr does not decrease for the modified probabilities with respect to its value associated with the original character probabilities, the original probabilities are kept and no probability update is carried out. This situation indicates that the approximation of the Baysian rule is not valid for this specific update.

PREDICTOR 30

Predicts the number of OCR errors in a batch of characters, Nerr, based on the character probabilities, P(x), where P(x) is the combined probability for a character image to be the ASCII character x given all available up-to-date sources of information: OCR, Logic, and previous key-in trials. As more information becomes available about the data by the key-in stations, P(x) and Nerr are dynamically updated accordingly by the probability updater 25 and the predictor 30 respectively. Note that when a character x is returned from a key-in station to the predictor 30, via the probability updater 25, not only its own probability has been modified by the probability updater 25 but also the probabilities of all the other characters in S(x).

Nerr is typically defined as follows:

Nerr=SUM [1−P(x)]

where the sum is over all the Ntotal characters, x, in the batch.

After character probabilities are modified by the probability updater 25, Nerr is modified as follows by predictor 30 (step 180):

For each character x whose probability was modified by probability updater 25 from Pold(x) to Pnew(x):

Nerr←Nerr+Pold(x)−Pnew(x)

That is, Nerr←Nerr+SUM (Pold(x)−Pnew(x)) where summation is over all the characters whose probabilities were modified. Since the modification is guaranteed to increment probabilities, Nerr is guaranteed to decrease.

The modified accuracy level for the new Nerr is obtained via:

Pacc=1−(Nerr/Ntotal).

When Pacc exceeds the value of Ptarget, the key-in process is terminated.

LOGIC UNIT 40

The Logic module supplies the following information on the input logical relationship and its characters S(x): an answer as to whether the logical relationship is True or False. It also may consider rounding of intermediate or final expressions in the relationship. The Logic may treat differently different logical relationships such as identity, checksum, summation, multiplication, etc. It also may consider sub-relationships inside a logical relationship, such as individual columns in a multiple-column summation logical relationship.

If the logical relationship is True: it supplies the modified (improved) probabilities of S(x), which are the probabilities of the logical relationship characters conditioned on the truthfulness of the logical relationship, by invoking the logic-based probability update procedure performed by probability updater 25.

If the logical relationship is False: it supplies the character or a set of characters which are the most probable to be misrecognized, along with the hypothesis of what should be their "true" value in order to make the logical relationship True.

SELECTOR 50

The Selector 50 selects from the set of characters suggested by the Logic 40 as being suspiciously erroneous a subset of characters to be sent to the key-in stations. If the ultimate goal of the system is to decrease manual key-in cost it is best to select a single character for each logical relationship, and re-invoke the Logic after keying-in this character to either confirm of reject the solution hypothesis suggested by the Logic. However, if computer computation time is also a factor in assessing the system efficiency, more than a single character may be keyed-in per each logical relationship between two successive invocation of the Logic 40. The character(s) may be selected as those for which the swapping probability from the current value to the hypothesized value is maximal, based on the confusion matrix histogram. A more complex analysis may be carried out in which estimated gain in probability (and thus gain in PAcc) versus the key-in cost may be computed for each of the hypothesized characters, and the character(s) for which the ratio of PAcc to key-in cost is maximal are selected.

DISPATCHER 60

The Dispatcher 60 dispatches the selected characters to the available key-in stations as to maximize key-in efficiency. It typically decides which character to send to which key-in station. The key-in station may be defined as physical stations personed by human operators. Virtual key-in stations may also be defined. These are functional key-in stations that are mapped into physical stations. For example, a human operator working at some physical site with different key-in methods at different time instances can be considered as multiple virtual key-in stations, one for each key-in method, all mapped to the same physical station, where each virtual key-in station has its own characteristics of cost and error rate per character. The dispatcher generally implements some optimization criterion of system efficiency. For example, it may be implemented to create a desired work load distribution on the physical work stations at desired time instants.

MANAGER 70

The manager 70 is a higher level stage of the system that manages the lower level agents: probability updater 25, predictor 30, logic 40, selector 50, dispatcher 60, and key-in stations 70, in an iterative process that creates an ASCII data with a predicted accuracy that is increased from iteration to iteration, for the whole batch of characters, until a desired accuracy level of Ptarget is achieved.

The manager 70 preferably performs the following steps:

Correction of errors that can be corrected by the Logic 40 (without keying in any data).

Correction of False logical relationships by iterating through hypothesized solutions suggested by the Logic, selecting and dispatching selected characters to key-in stations 70, incorporating the returned key-in data by modifying character probabilities, and re-assessing the predicted accuracy level.

Correction of characters which are not associated with any logic. Selection of characters of this type can be carried out by sorting their probabilities.

Correction of True-LRS (and/or false-LRS) characters until Ptarget is exceeded.

In any specific implementation, these steps may be interchanged and/or mixed according to the specific cost definition which the system is trying to minimize.

A preferred method of operation for the system of FIG. 1 is now described with reference to FIG. 2:

a. To comply with available computing power and memory, the input data may be divided into batches of characters. The larger the batch the better the prediction and thus the better the performance. Ideally, all the application is processed as one huge batch.

b. For each batch of characters the following steps are carried out:

Computation, by manager 70, of all the character a-posteriori probabilities (step 110 in FIG. 2)

Logic-based probability update: Modification of all character probabilities, P(x), for the True (and/or False) logical relationships to adjust for the truthfulness of the logic rules. Each true-LRS (true logical relationship) warrants a certain increase in the character probability of each character involved in the true logical relationship. Alternatively or in addition, probabilities can be modified (i.e. suitably lowered) for False logical relationships.

c. Then, an iterative process is carried out as follows:

The logic 40 is invoked to hypothesize characters that are the most probably erroneous (step 130 in FIG. 2)

The selector 50 is invoked to select a subset of the hypothesized characters to be send to the key-in stations 70. Typically, a single character is selected for each logical relationship (step 140 in FIG. 2)

The dispatcher 60 sends the selected characters to the appropriate key-in stations (step 150 in FIG. 2)

The new information from the key-in stations 70 is incorporated, and character probabilities are modified (steps 170 and 175 of FIG. 2). Modification of character probabilities preferably includes two separate processes, termed herein "key-in based probability update" and "logic-based probability update", which are described in detail herein (steps 170 and 175, respectively, in FIG. 2).

The predictor 30 is invoked to predict the number of remaining errors in the batch.

A stop-test is carried out to decide upon termination. If the predicted error rate is less than desired, the process is terminated.

As more characters are returned from key-in stations 70, the expected number of errors is decreased until it reaches the desired accuracy level defined by the user, in which case the processing is terminated.

It is appreciated that the embodiment described in detail hereinabove is only an example of a possible implementation of the present invention and many possible variations are possible which fall within the scope of the present invention, including but not limiting the following variations:

The use of a-posteriori OCR probabilities for the characters enables the incorporation of any OCR and is thus recommended. A training phase is preferably but not necessarily carried out, off-line, prior to system usage, in order to built the a-posteriori probability table for the OCR on a training data. Alternatively, in the absence of such a table, the original OCR probabilities may be used.

The characteristics of the operators in the key-in stations may be learned, off-line, during the system training phase. In addition, these characteristics may be modified on-line, during system utilization.

The implementation of the Logic function for a False-logical relationship can be implemented in various ways. For example, it can search for the most probable solution for the logical relationship based on the character probabilities. It may also use some constraints, such as using the minimal number of character swapping to find a valid solution. It can decouple the logical relationship into sub-logical relationships, such as breaking a summation logical relationship into columns and solve them from right to left.

Decoupling a logical relationship into sub-logical relationship is recommended whenever possible since it improves the estimation of the hypothesized solution. Different implementations may differ by changing trade-offs between computing consumption, hypothesis quality in terms of probability and external constraints.

In the absence of knowledge of the character probabilities for all the allowed value for a character, other non-Baysian approximations for the key-in probability update formulas that are suggested herein may be used as long as, preferably, the modified character probability is a combination of the old probability and the key-in station probability and that the modified probability is guaranteed to increase with respect to the old character probability.

Other formulae for the logic-based and/or key-in based probability update procedures may be used as long as, preferably, the modified probabilities result in a decrease of Nerr.

The selector may choose characters by a criterion that maximizes the swapping probabilities. The rationale in this case is to maximize the probability of finding recognition errors, which leads to minimizing the key-in cost, since erroneous characters must be keyed-in and corrected anyway, while keying in a correct character is a waste. Alternatively, the selector may choose characters for which the key-in error probability is minimal. The rationale in this case in to try and confirm or reject the Logic hypothesis at minimal key-in cost. Obviously, implementing the second approach requires adaptation of the selection to the specific method of how data is displayed and keyed in the key-in stations.

The Selector can be coupled with the Logic to optimize the characters that will be selected first in each logical relationship. For example, in a summation logical relationship that may contain carry characters from column to column, it is best to select erroneous characters from the rightmost columns first, since they affect the leftmost characters via the carry characters, and not vice-versa.

It is appreciated that the software components of the present invention may, if desired, be implemented in ROM (read-only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow.

What is claimed is:

1. A method for supplying machine readable text at low key-in cost, the method comprising:
    using key-in stations to improve accuracy of machine-generated Machine readable text, including dispatching machine-generated Machine readable text to various key-in stations using stored key-in station characteristic parameters to reduce key-in cost; and
    learning the key-in stations' characteristics and tuning said key-in station characteristic parameters, on-line, thereby to adjust for variation in working conditions.

2. A method according to claim 1 wherein said variation in working conditions comprise changes in at least one of the following:
    human operators operating the key-in stations;
    key-in methods,
    time of day, and
    working conditions.

3. A method according to claim 1 wherein the machine-readable text comprises ASCII output.

4. A system for supplying machine readable text at low key-in cost, the system comprising:
    a dispatcher operative to dispatch machine-generated machine readable text to various key-in stations using stored key-in station characteristic parameters to reduce key-in cost; and
    a key-in station monitor operative to learn the key-in stations' characteristics and to tune said key-in station characteristic parameters, on-line, thereby to adjust for variation in working conditions.

5. A system according to claim 4 wherein said variation in working conditions comprise changes in at least one of the following:
    human operators operating the key-in stations;
    key-in methods,
    time of day, and
    working conditions.

6. A system according to claim 4 wherein the machine readable text comprises ASCII.

7. A computer program product for supplying machine readable text using key-in stations to improve accuracy of machine-generated text,
    the program having computer readable program instructions embodied therein,
    which instructions cause a computer
        to dispatch the machine-generated text to various key-in stations using stored key-in station characteristic parameters to reduce key-in cost, and
        to learn the key-in stations' characteristics and tune said key-in station characteristic parameters on-line, thereby to adjust for variation in working conditions.

* * * * *